United States Patent [19]

Rapsilver

[11] Patent Number: 4,796,926
[45] Date of Patent: Jan. 10, 1989

[54] DUMP FITTING FOR SEWER HOSE

[76] Inventor: Benny L. Rapsilver, Rt. 4 Box 2640, Nacogdoches, Tex. 75961

[21] Appl. No.: 945,685

[22] Filed: Dec. 23, 1986

[51] Int. Cl.⁴ .......................................... F16L 43/00
[52] U.S. Cl. .................................. 285/181; 285/179; 285/253; 4/323; 141/311 R; 141/382; 141/392
[58] Field of Search ...................... 285/179, 182, 181; 4/321, 323; 138/106; 141/311 R, 382, 383, 384, 385, 386, 392

[56] References Cited

U.S. PATENT DOCUMENTS

| | | | |
|---|---|---|---|
| 757,573 | 4/1904 | Spencer | 285/181 X |
| 1,756,094 | 4/1930 | McGuirk | 285/181 |
| 1,846,500 | 2/1932 | Thompson . | |
| 3,334,821 | 8/1967 | Garrison . | |
| 3,633,219 | 1/1972 | Byrd . | |
| 3,730,228 | 5/1973 | Gibbs, Sr. | 285/302 X |
| 3,842,870 | 10/1974 | Burgess | 141/384 X |
| 4,082,242 | 4/1978 | Smith | 138/106 X |
| 4,133,347 | 1/1979 | Mercer | 4/321 X |
| 4,151,864 | 5/1979 | Thurman | 138/106 |
| 4,223,702 | 9/1980 | Cook | 138/106 |
| 4,228,978 | 10/1980 | Rand | 138/106 |
| 4,327,941 | 5/1982 | Schoepe | 285/179 X |
| 4,550,452 | 11/1985 | Tufts | 4/323 X |
| 4,570,273 | 2/1986 | Antos . | |

FOREIGN PATENT DOCUMENTS 2733571  2/1979  Fed. Rep. of Germany ...... 285/181

Primary Examiner—Thomas F. Callaghan
Attorney, Agent, or Firm—Fleit, Jacobson, Cohn & Price

[57] ABSTRACT

A dump fitting on the discharge end of a sewer hose leading from the waste holding tank of a recreational vehicle prevents the hose from jumping out of a sewer drain under the influence of effluent being discharged through the hose. The fitting is in the form of an elbow with one limb received in the discharge end of the sewer hose and the other limb forming an outlet for receipt in the sewer drain. The fitting is of sufficient weight to resist the thrust of effluent flowing through the hose and tending to lift its discharge end. The fitting may be a one-part plastic molding or a two-part fit-together molding.

2 Claims, 1 Drawing Sheet

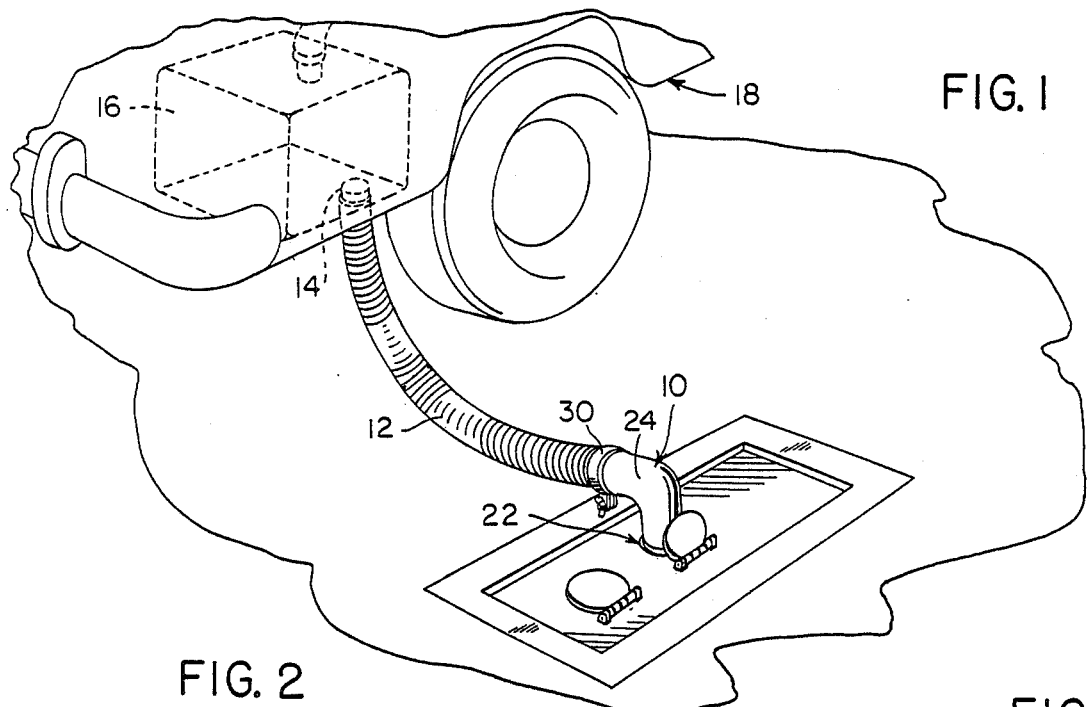
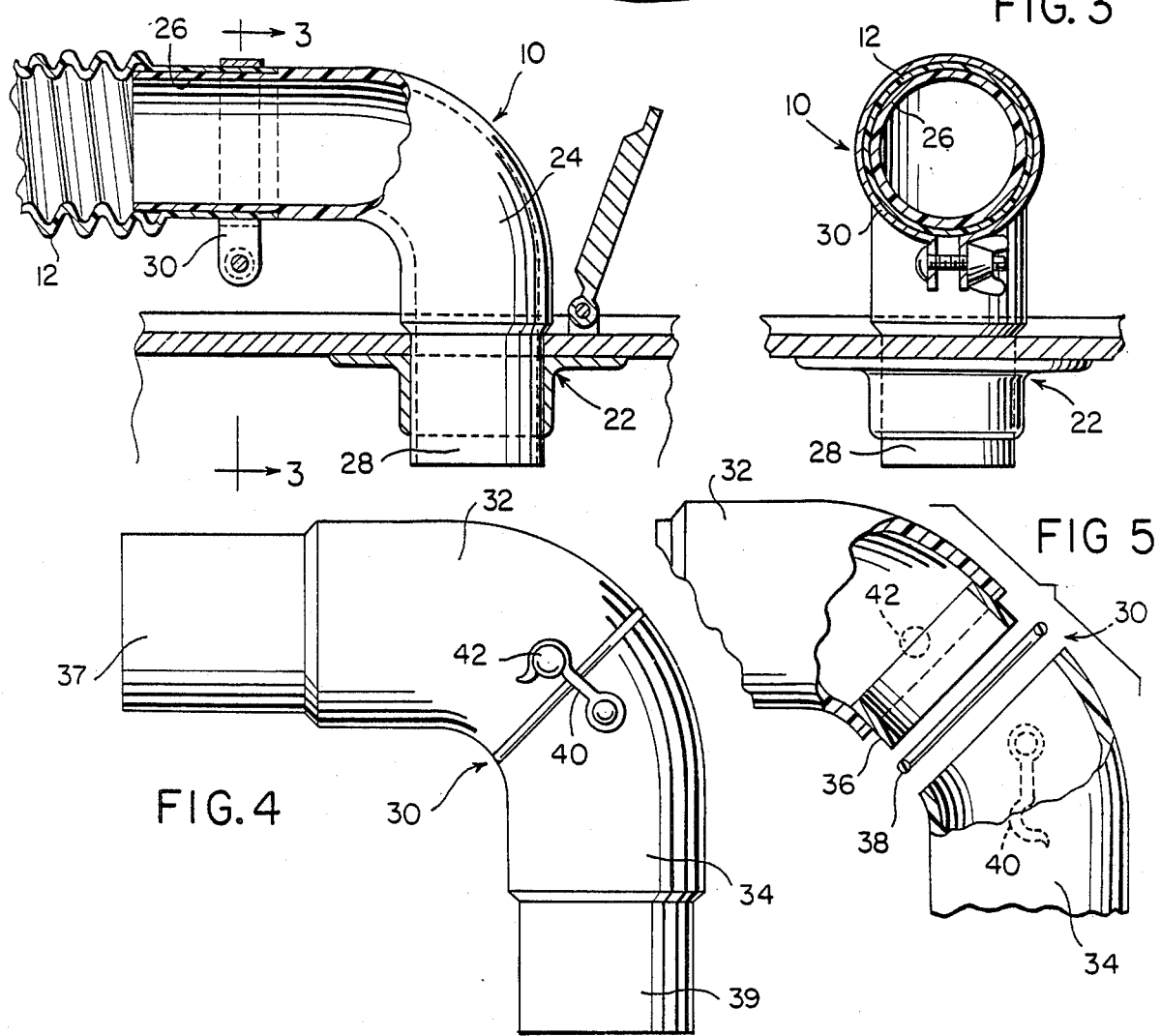

DUMP FITTING FOR SEWER HOSE

BACKGROUND OF THE INVENTION

This invention in general terms relates to sewer hoses of the type commonly used with recreational vehicles in dumping waste material from a holding tank associated with the vehicle. More particularly, the invention relates to a dump fitting for use on the discharge end of the sewer hose to overcome problems commonly encountered with such equipment.

Recreational vehicles generally are provided with a holding tank for sewage and other waste which is filled while the vehicle is on the road and which is discharged or dumped into a sewer drain, as generally found in camp sites or other vehicle lay-over locations, at the end of a journey. For this purpose, the holding tank is provided with a drain valve that is closed while the vehicle is on the road and which is opened to dump the holding tank through a sewer hose carried on board for connecting the drain valve to the sewer inlet.

Sewer hoses commonly in use with recreational vehicles tend to be of somewhat lightweight construction, for example they may be of wire-reinforced lightweight flexible plastic tubing generally of about 3 inches diameter. Accordingly, dumping of the holding tank at a camp site or like location is generally a 2-person operation, one person to operate the holding tank drain valve and another person to take charge of the discharge end of the hose and ensure it does not jump out of the sewer drain during dumping. If the hose is left unattended, the discharge end may tend to jump out of the drain when the flow of effluent is initiated due to the thrust of the effluent overcoming the lightweight construction of the hose. The effects of a sewer hose jumping out of the drain during effluent discharge through the hose are self-evident.

It is an object of the present invention to provide a hold-down fitting for the discharge end of a sewer hose of the type described which will prevent the hose from jumping out of the sewer drain or like fitting during effluent discharge, thereby enabling a recreational vehicle holding tank to be drained by a single operator manipulating the tank drain valve without the need for another person to guard the hose outlet.

Applicant is aware of the following U.S. patents relating to sewer hoses and like fittings. None of these patents, however, discloses a device having the features of the present invention:

U.S. Pat. Nos. 1,846,500—Feb. 23, 1932
3,334,821—Aug. 8, 1967
3,633,219—Aug. 20, 1970
3,730,228—May 1, 1973
4,327,941—May 4, 1982
4,570,273—Feb. 18, 1986

SUMMARY OF THE INVENTION

The invention provides a dump fitting for use on the discharge end of the sewer hose of a recreational vehicle to prevent the hose from jumping out of a sewer or like drain under the influence of effluent being discharged through the hose, the fitting being in the form of an elbow having one limb for receipt in the discharge end of the hose and another limb forming an outlet for receipt in the sewer or like drain, the fitting being of sufficient weight to resist the thrust of effluent flowing through the hose and tending to lift its discharge end. For example, for a standard 3-inch wire-reinforced lightweight plastic hose, the weight of the fitting preferably should be at least about 1¼ to 2 lbs.

The dump fitting may, for example, be molded in a hard plastic material such as PVC or ABS plastic and the one limb may be secured in the hose outlet with a surrounding hose clip. The fitting may comprise an integral 1-piece molding, or it may be molded as a pair of fit-together parts which connect at the point of the elbow and which have an interposed O-ring seal, and external clip or hook devices for releasably holding the parts together. The 2-part fitting may be useful, for example, for recreational vehicles in which the sewer hose is stored when not in use, in a rectangular section bumper which could not accommodate a 1-piece elbow fitting.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a part of a recreational vehicle including an effluent holding tank, a sewer hose for draining the holding tank, and a sewer drain into which the tank discharges, wherein the hose has a dump fitting in accordance with the invention at its discharge end.

FIG. 2 is an enlarged elevational view, partly in section, of the discharge end of the hose, the dump fitting, and the sewer drain inlet.

FIG. 3 is a sectional view on line 3—3 of FIG. 2.

FIG. 4 is an elevational view of a modified form of dump fitting.

FIG. 5 is an exploded view, partly in section, of the modified fitting.

DESCRIPTION OF THE PREFERRED EMBODIMENTS

Referring initially to FIGS. 1–3, there is illustrated a first embodiment dump fitting 10 in accordance with the invention attached to the outlet end of a conventional sewer hose 12 coming from a drain valve-controlled outlet 14 of the holding tank 16 in recreational vehicle 18. The holding tank, the drain valve (which is not shown) and the sewer hose may all be of well known form and construction for discharge of effluent from the holding tank, for example, into a sewer drain 22 at a camp site or like location. The construction of the sewer drain may vary from site to site and does not form part of the invention. The sewer hose may be of the attachable-detachable type and may be a lightweight wire-reinforced plastic tube.

Fitting 10 may be molded in a hard plastic material, as aforesaid, with a body portion 24 in the form of a 90° elbow and with spigoted ends 26, 28. One end 26 of the fitting is sized to fit in the discharge end of hose 12. A known form of stainless steel hose clip 30 is provided to hold the fitting in place. In use, for dumping tank 16, the other end 28 of the fitting is placed in the sewer drain.

The overall weight of fitting 10 is such as to prevent the thrust created by effluent flowing through hose 12 from causing the fitting to jump out of drain 22 when the holding tank drain valve is opened. Thus, for example, for a 3-inch lightweight hose, the weight of fitting 10 should preferably be at least about 1¼ to 2 lbs. Use of the fitting accordingly enables the holding tank to be drained by a single operator working the drain valve without having to have another person guard the hose outlet.

FIGS. 4 and 5 show a 2-piece fitting 30 equivalent to fitting 10 but useful, for example, in vehicles where the sewer hose is stored in a confined area which could not accommodate the complete elbow fitting. Accordingly, fitting 30 has a pair of body sections 32, 34 which connect together to form an elbow with a spigot section 36 and an O-ring seal 38 therebetween. The fitting has spigoted ends 37, 39 equivalent to ends 26, 28 of fitting 10. To releasably hold the sections 32, 34 together, pivotal eye hooks 40 and keepers 42 may be provided on opposite sides of respective sections. It is understood that the size and general weight characteristics of fitting 30 should be similar to those of fitting 10, and that the fittings are used in the same way.

The foregoing is considered as illustrative only of the principles of the invention. Further, since numerous modifications and changes readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a flexible sewer hose for discharging effluent from a holding tank of a recreational vehicle, a rigid dump fitting in the form of a tubular elbow connected to a discharge end of the hose, the dump fitting having an outlet for close fitting telescopic insertion in a sewer drain to enable flow of effluent from the hose into the sewer drain without interruption and being of a weight sufficient for preventing the discharge end of the hose from jumping out of the drain under the influence of thrust created by effluent flowing through the hose, said dump fitting having an inlet limb telescopically inserted in the discharge end of the sewer hose and hold in place by a hose clamp encircling the hose, and an outlet limb telescopically inserted into the sewer drain in close fitting relation with both limbs being rigid and provided with a spigoted end portion, said fitting being a two-piece molding of hard plastic comprising first and second sections and means for releasably connecting the sections substantially along a mid-plane of the elbow, said connecting means comprising a spigot element on one section telescoped into the other section, an O-ring seal carried on the spigot element and external interengageable latch elements on the respective sections, said latch elements including eye hooks pivotally mounted on one of the sections and eye hook keepers in the form of headed projections on the other section.

2. The invention of claim 1 wherein the sewer hose is a 3" diameter wire reinforced lightweight plastic tube and the dump fitting weights at least about 1¼ to 2 pounds.

* * * * *